(12) United States Patent
Sauer et al.

(10) Patent No.: US 10,736,478 B2
(45) Date of Patent: Aug. 11, 2020

(54) VACUUM CLEANER ROBOT

(71) Applicant: Eurofilters Holding N.V., Overpelt (BE)

(72) Inventors: Ralf Sauer, Overpelt (BE); Jan Schultink, Overpelt (BE)

(73) Assignee: EUROFILTERS HOLDING N.V., Overpelt (BE)

( * ) Notice: Subject to any disclaimer, the term of this patent is extended or adjusted under 35 U.S.C. 154(b) by 300 days.

(21) Appl. No.: 15/543,929

(22) PCT Filed: Dec. 11, 2015

(86) PCT No.: PCT/EP2015/079470
§ 371 (c)(1),
(2) Date: Jul. 14, 2017

(87) PCT Pub. No.: WO2016/116223
PCT Pub. Date: Jul. 28, 2016

(65) Prior Publication Data
US 2018/0008109 A1    Jan. 11, 2018

(30) Foreign Application Priority Data
Jan. 20, 2015  (EP) ..................... 15151741

(51) Int. Cl.
*A47L 9/00* (2006.01)
*B60B 19/00* (2006.01)
(Continued)

(52) U.S. Cl.
CPC ............. *A47L 9/009* (2013.01); *A47L 5/22* (2013.01); *A47L 5/362* (2013.01); *A47L 9/02* (2013.01);
(Continued)

(58) Field of Classification Search
None
See application file for complete search history.

(56) References Cited

U.S. PATENT DOCUMENTS

| | | |
|---|---|---|
| 2,036,056 A | 3/1936 | Kroenlein |
| 2,101,390 A | 12/1937 | Gorissen |

(Continued)

FOREIGN PATENT DOCUMENTS

| | | |
|---|---|---|
| CA | 2 498 435 A1 | 8/2006 |
| CN | 1121797 A | 5/1996 |

(Continued)

OTHER PUBLICATIONS

International Search Report dated May 3, 2016 for International Application No. PCT/EP2015/079470.

(Continued)

*Primary Examiner* — Brian D Keller
(74) *Attorney, Agent, or Firm* — Brinks Gilson & Lione

(57) ABSTRACT

The present invention relates to a vacuum cleaner robot comprising a floor nozzle supported on wheels and a dust collection unit, wherein the floor nozzle comprises a driving device for driving at least one of the wheels of the floor nozzle, wherein one of the wheels, a plurality of or all of the wheels of the floor nozzle are omnidirectional wheels, wherein the floor nozzle comprises a base plate with a base surface, which, when the vacuum cleaner robot is in operation, faces the surface to be cleaned, the base plate having provided therein an air flow channel, which extends parallel to the base surface and through which air to be cleaned enters the floor nozzle, and wherein the floor nozzle comprises a rotating means for rotating the air flow channel about an axis perpendicular to the base surface.

16 Claims, 5 Drawing Sheets

(51) Int. Cl.

| | | |
|---|---|---|
| *A47L 5/36* | (2006.01) | |
| *G05D 1/02* | (2020.01) | |
| *A47L 9/04* | (2006.01) | |
| *A47L 9/02* | (2006.01) | |
| *A47L 9/06* | (2006.01) | |
| *A47L 5/22* | (2006.01) | |

(52) U.S. Cl.
CPC ............ *A47L 9/0477* (2013.01); *A47L 9/066* (2013.01); *B60B 19/003* (2013.01); *G05D 1/024* (2013.01); *G05D 1/0246* (2013.01); *G05D 1/0248* (2013.01); *G05D 1/0255* (2013.01); *G05D 1/0257* (2013.01); *G05D 1/0295* (2013.01); *A47L 2201/00* (2013.01); *G05D 2201/0215* (2013.01)

(56) References Cited

U.S. PATENT DOCUMENTS

| | | | |
|---|---|---|---|
| 2,482,337 | A | 9/1949 | Hahn |
| 3,876,255 | A | 4/1975 | Ilon |
| 4,519,112 | A | 5/1985 | Bevington et al. |
| 4,644,606 | A | 2/1987 | Luerken et al. |
| 5,573,369 | A | 11/1996 | Du |
| 5,815,880 | A | 10/1998 | Nakanishi |
| 6,171,054 | B1 | 1/2001 | Mann et al. |
| 6,719,830 | B2 | 4/2004 | Illingworth et al. |
| 2001/0004719 | A1* | 6/2001 | Sommer ............... A47L 5/30 701/23 |
| 2002/0159897 | A1 | 10/2002 | Kegg et al. |
| 2003/0202890 | A1 | 10/2003 | Bundy |
| 2004/0200505 | A1 | 10/2004 | Taylor et al. |
| 2004/0211318 | A1 | 10/2004 | Morgan |
| 2005/0055792 | A1* | 3/2005 | Kisela ............... A47L 5/36 15/319 |
| 2006/0191098 | A1 | 8/2006 | Hiebert |
| 2007/0272463 | A1 | 11/2007 | Yu et al. |
| 2009/0133720 | A1* | 5/2009 | Van Den Bogert ..... A47L 5/362 134/18 |
| 2009/0314318 | A1* | 12/2009 | Chang ............... A47L 11/305 134/58 R |
| 2010/0256812 | A1 | 10/2010 | Tsusaka et al. |
| 2012/0211205 | A1* | 8/2012 | Eguchi ............... F04D 29/4226 165/121 |
| 2013/0292918 | A1 | 11/2013 | Schlee et al. |
| 2016/0146216 | A1* | 5/2016 | Chang ............... F04D 29/684 417/423.14 |

FOREIGN PATENT DOCUMENTS

| | | |
|---|---|---|
| CN | 1164825 A | 11/1997 |
| CN | 1041672 C | 1/1999 |
| CN | 1951283 A | 4/2007 |
| CN | 101384973 A | 3/2009 |
| CN | 201631115 U | 11/2010 |
| CN | 102014719 A | 4/2011 |
| CN | 203000795 U | 6/2013 |
| CN | 103369995 A | 10/2013 |
| DE | 298 03 415 U1 | 6/1998 |
| DE | 298 12 377 U1 | 10/1998 |
| DE | 20 2004 002284 U1 | 8/2004 |
| DE | 10 2008 019 976 A1 | 10/2009 |
| DE | 10 2008 046942 A1 | 3/2010 |
| DE | 10 2011 083 319 A1 | 3/2013 |
| DE | 20 2013 008 870 U1 | 12/2013 |
| DE | 10 2013 100 192 A1 | 7/2014 |
| EP | 1 360 922 A2 | 11/2003 |
| EP | 2 030 551 | 3/2009 |
| EP | 2 420 169 A1 | 2/2012 |
| EP | 2 420 171 A1 | 2/2012 |
| EP | 2 741 483 A2 | 6/2014 |
| EP | 2 979 742 A1 | 2/2016 |
| EP | 3 047 771 A1 | 7/2016 |
| FR | 2 847 791 A1 | 6/2004 |
| GB | 139 892 A | 3/1920 |
| GB | 419 191 A | 11/1934 |
| GB | 554 177 A | 5/1941 |
| GB | 2 344 750 A | 6/2000 |
| JP | H07 320 A | 1/1995 |
| JP | 2005 027829 A | 2/2005 |
| KR | 2005 0069018 A | 7/2005 |
| KR | 2006 0034851 A | 4/2006 |
| WO | WO 2002/058527 A1 | 8/2002 |
| WO | WO 2002/074150 A1 | 9/2002 |
| WO | WO 2007/068444 A1 | 6/2007 |
| WO | WO 2007/093926 A1 | 8/2007 |
| WO | WO 2007/117095 A1 | 10/2007 |
| WO | WO 2008/002027 A1 | 1/2008 |

OTHER PUBLICATIONS

Second Office Action in Chinese Application No. 2015-80069796.9 dated Jul. 30, 2019, including English translation and Chinese original.

* cited by examiner

VACUUM CLEANER ROBOT

This application claims the benefit under 35 U.S.C. § 371 of International Application No. PCT/EP2015/079470, filed Dec. 11, 2015, which claims the benefit of European Patent Application No. 15151741.4, filed Jan. 20, 2015; which are incorporated by reference herein in their entirety.

The present invention relates to a vacuum cleaner robot.

Conventional vacuum cleaners are operated by a user, who moves the vacuum cleaner and, in particular, the floor nozzle through which dust is sucked in, over the surface to be cleaned. Conventional canister vacuum cleaners, for example, comprise a housing mounted on rollers and/or skids. The housing has arranged therein a dust collecting container, in which a filter bag is provided. A floor nozzle is connected to the dust collecting chamber via a suction tube and a suction hose. In the case of conventional canister vacuum cleaners, the housing has additionally arranged therein a motor fan unit, which generates a negative pressure in the dust collecting container. When seen in the air flow direction, the motor fan unit is therefore arranged downstream of the floor nozzle, the suction tube, the suction hose as well as the dust collecting container and the filter bag, respectively. Since the air flowing through such motor fan units is purified air, the latter are sometimes also referred to as "clean air motors".

In particular in former times, there were also vacuum cleaners in which the sucked-in dirty air was conducted directly through the motor fan and into a dust bag that adjoined the latter directly. Examples of such vacuum cleaners are shown in U.S. Pat Nos. 2,101,390, 2,036,056 and 2,482,337. Today, these types of vacuum cleaners are no longer very common.

Such dirty air motor fans are also referred to as "dirty air motors" or "direct air motors". The use of such dirty air motors is also described in documents GB 554 177, U.S. Pat. Nos. 4,644,606, 4,519,112, US 2002/0159897, U.S. Pat. No. 5,573,369, US 2003/0202890 or U.S. Pat. No. 6,171,054.

In recent years, also vacuum cleaner robots have gained popularity. Such vacuum cleaner robots no longer require a user who moves them over the surface to be cleaned, but they automatically cover the floor. Examples of such vacuum cleaner robots are known e.g. from EP 2 741 483, DE 10 2013 100 192 and US 2007/0272463.

These known vacuum cleaner robots are disadvantageous insofar as they only have a small uptake of dust. This is either due to the fact that dust uptake is only accomplished through the brushing effect of a rotating brush roller or that the motor fan units used have very low power.

An alternative vacuum cleaner robot is described in WO 02/074150. This vacuum cleaner robot has a bipartite structural design and comprises a container or fan unit and a cleaning head unit communicating with the fan unit via a hose.

Against this background, the object underlying the present invention is to provide an improved vacuum cleaner robot.

This object is achieved by the subject matter of claim 1. According to the present invention a vacuum cleaner robot is provided, which comprises a floor nozzle supported on wheels and a dust collection unit, wherein the floor nozzle comprises a driving device for driving at least one of the wheels of the floor nozzle, wherein one of the wheels, a plurality of or all of the wheels of the floor nozzle are omnidirectional wheels, wherein the floor nozzle comprises a base plate with a base surface, which, when the vacuum cleaner robot is in operation, faces the surface to be cleaned, the base plate having provided therein an air flow channel, which extends parallel to the base surface and through which air to be cleaned enters the floor nozzle, and wherein the floor nozzle comprises a rotating means for rotating the air flow channel about an axis perpendicular to the base surface.

The use of one or of a plurality of omnidirectional wheels allows a very flexible and versatile movement of the floor nozzle, thus enabling the vacuum cleaner robot to reliably reach and leave even narrow surfaces that are different to reach. The rotating means allows the air flow channel, through which dirt and dust to be taken up enters the floor nozzle, to be oriented in an advantageous manner. This increases the suction efficiency of the vacuum cleaner robot, since in particular the floor area acted upon by the floor nozzle through the air flow channel is optimized.

The base plate is also referred to as nozzle sole. The air flow channel is also referred to as suction slot, nozzle opening, suction mouth or suction channel.

Each omnidirectional wheel may have, on its circumference, a plurality of rotatably supported rollers or roller bodies whose axes do not extend parallel to the wheel axis (of the omnidirectional wheel). In particular, the roller axes may extend at an oblique angle to or transversely to the wheel axis, or may be oriented in this way. An example of an omnidirectional wheel is a Mecanum wheel, which is described e.g. in U.S. Pat. No. 3,876,255.

The base surface of the base plate may rest on the surface to be vacuum cleaned (the floor), when the vacuum cleaner robot is in operation, or it may be spaced apart from said surface. The floor nozzle may have a bristle strip by means of which, in the case of a spaced-apart arrangement, the flow of air through the slot between the surface to be cleaned and the base plate can be adjusted. The air flow channel may have a straight, i.e. a non-curved shape parallel to the base surface. It may have two parallel, in particular straight transverse sides. It may in particular have a rectangular shape or base surface.

The longitudinal direction is the direction in which the air flow channel has its minimum extension parallel to the base surface of the floor nozzle; the transverse direction is perpendicular thereto (i.e. in the direction of the maximum extension of the air flow channel) and again parallel to the base surface. It follows that the longitudinal sides are the sides along and parallel to the direction of minimum extension and the transverse sides are the sides along the direction of maximum extension in the plane of the base surface.

The floor nozzle may also have a plurality of air flow channels. If a plurality of air flow channels is provided, they may have the same shape or different shapes.

The floor nozzle may be provided with a lifting unit for adjusting the height level of the base plate above the floor. The floor clearance of the floor nozzle can be adjusted in this way, especially if a bristle strip is used. Making use of the lifting unit, the base plate can be lifted and lowered relative to the wheel axles. The lifting unit may be configured fully mechanically or electromechanically.

The rotating means may be configured for orienting the air flow channel perpendicular to the direction of movement of the floor nozzle. It follows that the (e.g. rectangular) air flow channel is oriented parallel to the direction of movement of the floor nozzle as regards its longitudinal direction and perpendicular to the direction of movement of the floor nozzle as regards its transverse direction. The longitudinal direction is the direction in which the air flow channel has its minimum extension parallel to the base surface of the floor nozzle; the transverse direction is perpendicular thereto (i.e. in the direction of the maximum extension of the air flow channel) and again parallel to the base surface.

In this way, the area over which the air flow channel slides is maximized transversely to the direction of movement of the floor nozzle.

The rotating means may comprise a rotary disk, which is supported such that it is rotatable about an axis perpendicular to the base surface of the base plate and which has the air flow channel formed therein (partly or fully). This kind of rotary disk, which is rotatable about a vertical axis, allows an easy orientation of the air flow channel. The rotary disk may be configured as part of the base plate.

The rotating means may comprise a rotary drive for rotating the air flow channel, in particular for rotating the rotary disk. The rotating means may be coupled to the shaft of the motor fan unit.

The vacuum cleaner robots described may comprise an electronic rotation control unit for controlling the rotating means, especially the rotary disk. In particular, the electronic rotation control unit may be coupled to the driving device of the floor nozzle.

Alternatively, the vacuum cleaner robot may comprise a castor with an angle sensor, the rotation control unit being coupled to the angle sensor. The castor automatically orients itself towards the direction of movement. In this way, the rotation control unit can, on the basis of a signal of the angle sensor (e.g. a rotary encoder), detect the direction of movement of the vacuum cleaner robot.

The castor has a horizontal axis of rotation which does not intersect the vertical axis of rotation of the castor.

Alternatively, the vacuum cleaner robots may also have a mechanical rotation control unit for controlling the rotating means. The rotary disk may here be supported in a freely rotatable manner. The mechanical rotation control unit may e.g. comprise a roller, which, displaced relative to the axis of rotation of the rotary disk, is connected to the rotary disk such that it is not movable about a horizontal axis. The roller is here oriented in the direction of movement through a rotation of the rotary disk that is supported in a freely rotatable manner. This leads consequently also to a transverse orientation of the air flow channel.

The air flow channel may have, in a transverse direction, a dimension of at least 90%, preferably of at least 95%, of a width of the floor nozzle, in particular of the base plate and/or of the rotary disk. An air flow channel extending in this way over the width of the floor nozzle (or of the base surface thereof) also allows areas along a wall to be reached in an advantageous manner.

The air flow channel may, with both ends, extend in its transverse direction (i.e. the longitudinal sides) up to the edge of the rotary disk and/or up to the edge of the base plate, i.e. over the full width of the base plate. The area over which the air flow channel slides can thus be rendered as large as possible. The two sides of the air flow channel along its transverse direction may define secants with respect to the rotary disk.

The base plate and/or the rotary disk may be configured such that, at least at a predetermined position of the rotary disk, the air flow channel extends across the rotary disk and (at least partially) across the base plate. To this end, the base plate may have formed therein one or a plurality of subchannels bordering on the rotary disk. These subchannels will then define extensions of the air flow channel, if the rotary disk is at a position at which the subchannels border on the air flow channel in the rotary disk, i.e. adjoin said channel or are in alignment therewith.

In the case of the above described vacuum cleaner robots, the wheels may be arranged within a width of the base plate. In other words, the wheels will then not extend beyond the width of the base plate and they are not arranged beside a longitudinal side of the base plate. Hence, the floor nozzle, and in particular the base plate, can be moved into close proximity to a wall, without being spaced apart therefrom by a wheel arranged beside the base plate, thus allowing surfaces that extend along walls to be cleaned in an advantageous manner.

In the case of the above described vacuum cleaner robots, the dust collection unit may be supported together with the floor nozzle on the wheels of the floor nozzle. In this way, a one-piece vacuum cleaner robot can be provided. Hence, it is here not necessary that the dust collection unit has a separate drive or a drive of its own; the dust collection unit is moved together with and jointly with the floor nozzle.

Alternatively, the dust collection unit may be supported on wheels separately from the floor nozzle and may be in fluidic communication with the floor nozzle via a suction hose, the dust collection unit comprising here a driving device for driving at least one of the wheels of the dust collection unit.

According to this alternative, the dust collection unit and the floor nozzle are configured as separate or distinct units; each of these units is supported (separately) on wheels of its own. Hence, the vacuum cleaner robot is here a bipartite vacuum cleaner. The dust collection unit and the floor nozzle are movable independently of one another.

The driving device of the dust collection unit may be configured independently of or separately from the driving device of the floor nozzle. In particular, the dust collection unit and the floor nozzle may be driven independently of one another. They may e.g. move in different directions. In addition, one of them may be not moved, whereas the other one is moved.

If the dust collection unit is supported on wheels separately from the floor nozzle, one of the wheels, a plurality of or all of the wheels of the dust collection unit may be omnidirectional wheels. Thus, also the dust collection unit can be moved in a very flexible and versatile manner.

The vacuum cleaner robots described may further comprise a motor fan unit for sucking in a flow of air through the floor nozzle. The motor fan unit may be a dirty air motor or a clean air motor (as described above).

The motor fan unit may comprise a radial fan, in particular a single-stage radial fan. The use of a motor fan unit leads to particularly good cleaning, i.e. vacuum cleaning results. In a radial fan air is sucked in parallel to or axially to the drive axle of the fan wheel and deflected, in particular by approximately 90°, through the rotation of the fan wheel and is then radially blown out.

The floor nozzle has a suction opening for establishing a fluidic connection to the motor fan unit. This suction opening is in fluidic communication with the air flow channel. Through the air flow channel, the contact pressure of the floor nozzle is adjusted in an advantageous manner, and good suction power is achieved.

The motor fan unit may be arranged between the floor nozzle and the dust collection unit such that a flow of air sucked in through the floor nozzle will pass through the motor fan unit and flow into the dust collection unit.

A dirty air motor or direct air motor is thus used in an advantageous manner in a vacuum cleaner robot. The vacuum cleaner robot according to the present invention allows to achieve, also with little motor power, a high volumetric flow rate. A dirty air motor has e.g. a maximum speed of less than 30,000 rpm and an electric input power of less than 900 W.

In the case of the above described vacuum cleaner robots, the motor fan unit may be arranged on and/or over the floor nozzle, in particular directly on and/or over the floor nozzle. This leads to an advantageous suction power. In addition, a compact structural design of the unit comprising the floor nozzle and the motor fan unit can be achieved. The motor fan unit may e.g. be arranged such that air sucked in through the floor nozzle enters the motor fan unit directly from the floor nozzle.

The motor fan unit may be in fluidic communication with the floor nozzle via a tube section. In this case, the motor fan unit is no longer arranged directly on and/or over the floor nozzle. The tube section may in particular have a length of 10 mm to 300 mm, preferably 10 mm to 100 mm.

The dust collection unit may be in fluidic communication with the floor nozzle via a suction hose, the motor fan unit being arranged between the floor nozzle and the suction hose such that the flow of air sucked in through the floor nozzle will pass through the motor fan unit and flow into the suction hose. This kind of structural design has the effect that, during operation, an excess pressure will prevail also in the suction hose. Hence, the suction hose wall will, if at all, have to be reinforced only slightly.

When seen in the direction of air flow, the floor nozzle, which is sometimes also referred to as "suction nozzle", is arranged upstream of the suction hose and the suction hose is arranged upstream of the dust collection unit. The air sucked in through the floor nozzle by means of the motor fan unit is conducted first into the suction hose and then into the dust collection unit. Due to the fluidic connection, a continuous flow of air through the floor nozzle and the suction hose into the dust collection unit is guaranteed.

Surprisingly enough, it turned out that dirty air motors can be used in an advantageous manner also in vacuum cleaner robots, in particular for conveying the dirty air, which has been sucked in through the floor nozzle, through the motor fan unit and into the dust collection unit.

Other than in the case of conventional vacuum cleaner robots, where, during operation, a negative pressure prevails in particular in the dust collection unit and the dust collection chamber, respectively, the vacuum cleaner robot described here is configured such that an excess pressure prevails, at least in the dust collection unit. In this way, the wall thicknesses of the dust collection unit can be reduced and a smaller number of reinforcing elements (such as reinforcing ribs) can be used, or the use of such elements can even be avoided completely, and this will also lead to a reduction of weight.

The structural design of the vacuum cleaner robot, which comprises a dust collection unit and a floor nozzle connected thereto via a hose, allows a particularly advantageous uptake of dust in combination with high flexibility. In particular, the floor nozzle will, even under conditions of limited space, be able to reach the surfaces to be vacuum cleaned on the one hand and, on the other hand, the dust collection unit can provide a comparatively large dust holding volume.

Alternatively, the dust collection unit may be in fluidic communication with the floor nozzle via a suction hose, the motor fan unit being arranged between the suction hose and the dust collection unit such that the flow of air sucked in through the floor nozzle will pass through the suction hose and flow into the motor fan unit, and pass through the motor fan unit and flow into the dust collection unit.

In this way, a light and compact arrangement can be accomplished on the floor nozzle side, and this has the effect that the floor nozzle will be highly movable and that even areas of limited space can be reached.

In particular, the dust collection unit may comprise a housing and a dust collector arranged within said housing, the motor fan unit being arranged on, at or in said housing.

The housing may comprise a housing wall, which is especially made of plastic.

Arranging the dust collector within the housing of the dust collection unit and arranging the motor fan unit on or in the housing allows a compact structural design of the dust collection unit and thus of the vacuum cleaner robot in its entirety.

The motor fan unit may (in particular during operation of the vacuum cleaner robot) be arranged over or above the dust collector or on the same level as the dust collector. It follows that the motor fan unit is especially not arranged below the dust collector. Therefore, the dirty air need not, or only to a minor extent be conveyed through the motor fan unit against the force of gravity.

The motor fan unit may be arranged on the housing. In particular the dust collector may, during operation of the vacuum cleaner robot, be arranged below or on the same level as the motor fan unit.

The dust collection unit may have three or four wheels, in particular precisely three or precisely four wheels. The driving device of the dust collection unit may be configured for driving one of the wheels, a plurality of them or all of the wheels of the dust collection unit. The driving device may have a separate or independent drive unit for each drivable wheel. This allows each wheel to be driven independently and separately.

The floor nozzle may have three or four wheels, in particular precisely three or precisely four wheels. The driving device of the floor nozzle may be configured for driving one of the wheels, a plurality of them or all of the wheels of the floor nozzle. The driving device may have a separate or independent drive unit for each drivable wheel. This allows each wheel to be driven independently and separately.

The motor fan unit may be configured such that it generates, with an electric input power of less than 450 W according to DIN EN 60312-1 using aperture 8, a volumetric flow rate of more than 30 l/s, in particular more than 35 l/s. Alternatively or additionally, the motor fan unit may be configured such that it generates, with an electric input power of less than 250 W according to DIN EN 60312-1 using aperture 8, a volumetric flow rate of more than 25 l/s, in particular more than 30 l/s. Alternatively or additionally, the motor fan unit may be configured such that it generates, with an electric input power of less than 100 W according to DIN EN 60312-1 using aperture 8, a volumetric flow rate of more than 10 l/s, in particular more than 15 l/s.

In this way, a particularly efficient vacuum cleaner robot is obtained, which, in particular in comparison with conventional vacuum cleaner robots, exhibits a significant increase in suction power.

The air data of a vacuum cleaner and of a motor fan unit, respectively, are determined according to DIN EN 60312-1:2014-01. Reference is especially made to section 5.8. The measuring device type B according to section 7.3.7.3 is here used. If a motor fan unit having no vacuum cleaner housing is measured, said measuring device B will be used also in this case. As regards possibly required adaptors for connection to the measurement chamber, the statements made under 7.3.7.1 apply.

Instead of the term "flow of air" according to DIN EN 60312-1 also the terms "volumetric flow" and "suction air stream" are used.

The suction hose may have a diameter in a range of 25 mm to 50 mm and/or a length in a range of 500 mm to 2500 mm. The suction hose may be configured such that it is flexible, in particular such that it is deformable, when the vacuum cleaner robot is used as intended. The suction hose may consist partly or fully of plastic material. In particular, it may comprise a plastic wall and/or a reinforcement made of metal (e.g. a spiral wire). The suction hose may be configured as a stretch hose. It is therefore variable in length and can be extended to a length that is several times as long as the non-stretched (inactive) hose length.

The suction hose may have a constant or a variable diameter along its length. In particular, the suction hose may be conical in shape, the diameter narrowing preferably towards the floor nozzle. The above specified diameters refer in particular to the smallest diameter of the suction hose.

The dust collection unit may be configured such that and/or the motor fan unit may be arranged such that contacting the fan wheel of the motor fan unit with a test probe according to IEC/EN 60335 through the floor nozzle will be impossible. In this respect, section 8 of the version DIN EN 60335-1: 2012-10 is referred to. The test probe used should in particular be test probe B.

This reduces the risk of damage that may be caused to the motor fan unit and the risk of injuries that may be caused when the floor nozzle is touched with the motor running.

The dust collection unit may comprise a lifting unit for adjusting the height level of the lower surface of the dust collection unit, in particular of the lower surface of the housing of the dust collection unit, above the floor. The distance of the lower surface of the dust collection unit, i.e. the floor clearance of the dust collection unit, can be adjusted in this way. This allows, e.g. at a charging position of the vacuum cleaner robot, an increase in the height level of the lower surface above the floor, so that the floor nozzle can be moved below the dust collection unit and its housing, respectively.

The vacuum cleaner robot may be a bag-type vacuum cleaner. A bag-type vacuum cleaner is a vacuum cleaner in which the sucked-in dust is separated and collected in a vacuum cleaner filter bag. The filter area of the vacuum cleaner filter bag may be at least 800 cm$^2$. The vacuum cleaner robot may in particular be a bag-type vacuum cleaner for disposable bags.

The term filter area of a vacuum cleaner filter bag stands for the whole area of the filter material located between or within the edge-side seams (e.g. weld seams or bond seams). In this respect, also possibly existing lateral pleats or surface pleats should be taken into account. The area of the bag filling opening or inlet opening (including a seam surrounding this opening) is not part of the filter area.

The vacuum cleaner filter bag may be a flat bag or a filter bag having a block bottom. A flat bag is defined by two sidewalls of filter material, which are connected to one another along their peripheral edges (e.g. by means of welding or bonding). One of the two sidewalls may have provided therein the bag filling opening or inlet opening. The lateral surfaces or sidewalls may each have a rectangular basic shape. Each sidewall may comprise one or a plurality of layers of a nonwoven and/or of a nonwoven fabric.

The vacuum cleaner robot in the form of a bag-type vacuum cleaner may comprise a vacuum cleaner filter bag, the vacuum cleaner filter bag being configured in the form of a flat bag and/or a disposable bag.

The bag wall of the vacuum cleaner filter bag may comprise one or a plurality of layers of a nonwoven and/or one or a plurality of layers of a nonwoven fabric. In particular, it may comprise a laminate consisting of one or a plurality of layers of a nonwoven and/or of one or a plurality of layers of a nonwoven fabric. This kind of laminate is described e.g. in WO 2007/068444.

The term nonwoven fabric is understood in the sense of the standard DIN EN ISO 9092:2010. In this context, in particular film and paper structures, especially filter paper, are not regarded as a nonwoven fabric. A "nonwoven" is a structure of fibers and/or endless filaments or short-fiber yarns which have been formed into an area-measured material by some kind of process (except for the interlacing of yarns, as in a woven fabric, knotted fabric, knitted fabric, lace or tufted fabric), but not connected to one another by some kind of process. Through a connecting process, a nonwoven is converted into a nonwoven fabric. The nonwoven or the nonwoven fabric may be dry laid, wet laid or extruded.

The vacuum cleaner robot may comprise an exhaust filter, in particular an exhaust filter having a filter area of at least 800 cm$^2$. The exhaust filter may especially be configured as a pleated or folded filter. Thus, a large surface area for a smaller base area can be achieved. The exhaust filter may be provided in a holder of the type described e.g. in European patent application No. 14179375.2. Such exhaust filters allow the use of vacuum cleaner filter bags having little separation efficiency, e.g. single-layer vacuum cleaner filter bags. The vacuum cleaner filter bag having little separation efficiency may e.g. be a bag in the case of which the filter material of the bag wall consists of a spunbond having a grammage of 20 g/m$^2$ to 60 g/m$^2$. The vacuum cleaner filter bag may thus especially be configured as a single-layer filter bag. Alternatively, a bag may e.g. be used, in the case of which the filter material of the bag wall consists of a laminate comprising a spunbond, a meltblown material and a further spunbond (SMS).

Alternatively, the vacuum cleaner robot may be a bagless vacuum cleaner, in particular a vacuum cleaner including an exhaust filter of the type described hereinbefore, which has a filter area of at least 800 cm$^2$. A bagless vacuum cleaner is a vacuum cleaner in which the sucked-in dust is separated and collected without any vacuum cleaner filter bag. In this case, the dust collection unit may comprise an impact separator or a centrifugal force separator or cyclone.

In principle, the floor nozzle may be an active or a passive floor nozzle. An active floor nozzle comprises a brush roller (which is sometimes also referred to as beater brush and/or rotating brush) in the suction opening. Hence, the vacuum cleaner robots described may comprise a brush roller. The brush roller may be adapted to be driven by an electric motor. A passive floor nozzle does not have any brush roller.

The above described vacuum cleaner robots allow to achieve, on the basis of their overall structural design, a very good efficiency and suction power even with a passive floor nozzle, i.e. without any brush roller. The use of passive floor nozzles leads to a simpler structural design, thus reducing the weight of the floor nozzle, whereby the power requirements of the driving device of the floor nozzle will be reduced.

The vacuum cleaner robots described are configured for independently and autonomously covering a surface to be cleaned.

The vacuum cleaner robots described may comprise a control and navigation unit for an automatic movement of the floor nozzle and/or of the dust collection unit. This allows autonomous vacuum cleaning through the vacuum cleaner robot. The control and navigation unit may especially be configured for controlling the driving device of the dust collection unit, the driving device of the floor nozzle and/or the motor fan unit. The control and navigation unit may be arranged on or in the dust collection unit and/or on or in the floor nozzle. In particular, the control and navigation unit may be arranged exclusively on or in the dust collection unit. In this case, also the control and navigation of the floor nozzle may be executed on the side of the dust collection unit.

The vacuum cleaner robots described may comprise a unit for transmitting control signals from the control and navigation unit to the floor nozzle. The unit for transmitting control signals may be configured for establishing a wired or a wireless transmission.

The vacuum cleaner robots described may comprise one or a plurality of position determination means. The position determination means may especially be cameras, path sensors and/or distance sensors. The distance sensors may be based e.g. on acoustic waves or on electromagnetic waves. The position determination means may be arranged on or in the dust collection unit and/or on or in the floor nozzle.

The vacuum cleaner robots described may be provided with a wireless power supply. In particular, they may comprise a rechargeable battery for the purpose of power supply.

Additional features will be described with reference to the figures, in which

Figure 1:
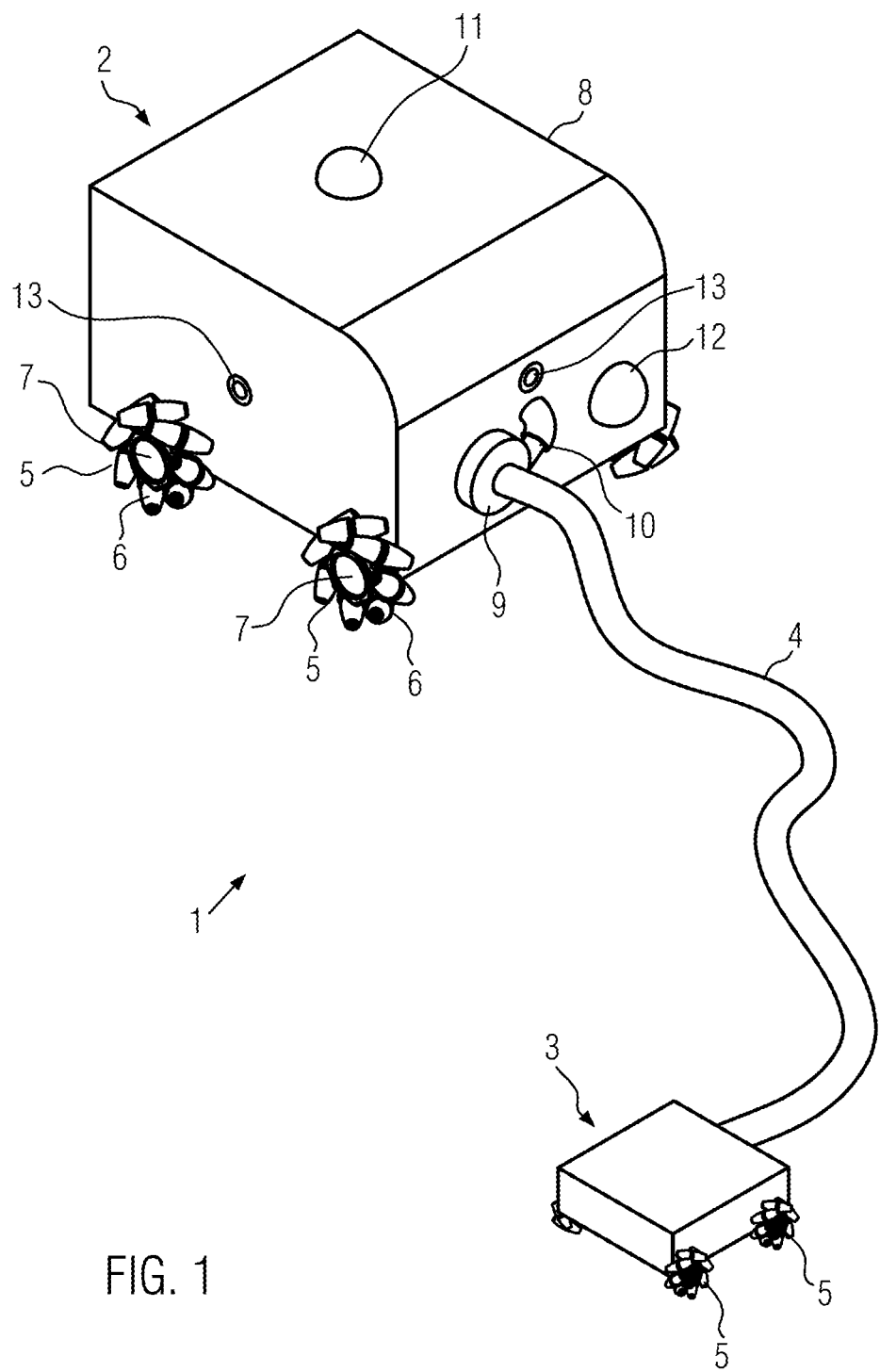
FIG. 1 shows an embodiment of a bipartite vacuum cleaner robot.

FIG. 1 shows a schematic representation of a first embodiment of a vacuum cleaner robot 1. The vacuum cleaner robot 1 shown comprises a dust collection unit 2 and a floor nozzle 3 connected to the dust collection unit 2 via a flexible suction hose 4. The vacuum cleaner robot 1 thus has a bipartite structural design, the dust collection unit 2 and the floor nozzle 3 defining separate units, which are only connected to one another via the suction hose 4.

The dust collection unit 2 is supported on four wheels 5, each of said wheels being configured as an omnidirectional wheel. Each omnidirectional wheel 5 has a plurality of rotatably mounted rollers 6 provided on the circumference thereof. None of the axes of rotation of said rollers 6 is parallel to the wheel axis 7 of the respective omnidirectional wheel. The axes of rotation of the rollers may e.g. define an angle of 45° with respect to the respective wheel axis. The surfaces of the rollers or roller bodies are curved or arcuate.

Examples of such omnidirectional wheels are described in U.S. Pat. No. 3,876,255, US 2013/0292918, DE 10 2008 019 976 or DE 20 2013 008 870.

The dust collection unit 2 includes a driving device for driving the wheels 5 of the dust collection unit. The driving device may have a separate drive unit, e.g. in the form of an electric motor, for each wheel 5, so that each wheel 5 can be driven independently of the other wheels. The rollers 6 are mounted for unpowered rotation.

By suitably driving individual ones or all of the wheels 5, the dust collection unit 2 can be moved in any direction. If, for example, all four wheels 5 are moved at the same speed and in the same direction of rotation, the dust collection unit will go straight on. When the wheels on one side rotate in an opposite direction, a lateral movement or displacement can be achieved.

in principle, not all the wheels have to be configured such that they are drivable; individual wheels may also be provided without having a drive of their own. In addition, it is also possible that individual wheels, even though they are in principle drivable, are not driven for certain movements.

According to alternative embodiments, also less than or more than four wheels may be configured in the form of omnidirectional wheels. An example with three omnidirectional wheels is described in US 2007/0272463.

In the example shown, also the floor nozzle 3 is provided with four omnidirectional wheels 5. These wheels are smaller in size than the wheels of the dust collection unit 2 according to this embodiment. In an analogous form, also the floor nozzle 3 includes a driving device for the wheels 5. Also in this case, the driving device comprises for each wheel a separate drive unit, e.g. in the form of electric motors, so as to drive each individual wheel separately and independently of the other wheels. In this way, also the floor nozzle can be moved in any direction by suitably driving the wheels.

The floor nozzle 3 has a base plate with a base surface which, when the vacuum cleaner robot is in operation, faces the floor, i.e. the surface to be vacuum cleaned. The base plate has provided therein an air flow channel, which extends parallel to the base surface and through which the dirty air is sucked in. In addition, a rotating means is provided, which will be described in more detail hereinafter and which is used for rotating the air flow channel about an axis perpendicular to the base surface.

In the examples shown, the dust collection unit 2 comprises a housing 8 having a motor fan unit 9 arranged thereat and thereon. A tube section 10 leads from the motor fan unit 9 into the interior of the housing 8 to a vacuum cleaner filter bag, which is arranged within said housing and which defines a dust collector. The vacuum cleaner filter bag may removably be secured in position in the interior of the housing 8 in a conventional manner, e.g. by means of a retaining plate.

It follows that, in the arrangement shown, a continuous fluidic connection to the dust collector is established through the floor nozzle 3, the suction hose 4, the motor fan unit 9 and the tube section 10. The motor fan unit 9 is here arranged between the suction hose 4 and the dust collector, so that dirty air sucked in through the floor nozzle will pass through the motor fan unit 9 (especially via the tube section 10) and flow into the vacuum cleaner filter bag arranged in the interior of the housing 8.

The motor fan unit 9 is therefore a dirty air motor. It is, in particular, a motor fan unit comprising a radial fan.

The motor fan unit has, with an electric input power of less than 450 W, a volumetric flow rate of more than 30 l/s (determined in accordance with DIN EN 60312-1:2014-01 using aperture 8), with an electric input power of less than 250 W, a volumetric flow rate of more than 25 l/s, and with an electric input power of less than 100 W, a volumetric flow rate of more than 10 l/s.

The fan diameter may range from 60 mm to 160 mm. For example, a motor fan unit of the firm of AMETEC, Inc. may be used, which is also used in Soniclean upright vacuum cleaners (e.g. SONICLEAN VT PLUS).

The motor fan unit of the vacuum cleaner SONICLEAN VT PLUS was characterized according to DIN EN 60312-1:2014-01 as explained above. The motor fan unit was measured without a vacuum cleaner housing. As regards necessary adaptors for connection to the measurement chamber, the statements made under 7.3.7.1. apply. The Table shows that high volumetric flow rates are accomplished at low speeds and small input power.

| AMETEK "dirty air" (fan wheel diameter 82 mm) using aperture 8 (40 mm) | | | | |
|---|---|---|---|---|
| input power [W] | voltage [V] | speed [RPM] | negative pressure box [kPa] | volumetric flow rate [l/s] |
| 200 | 77 | 15,700 | 0.98 | 30.2 |
| 250 | 87 | 17,200 | 1.17 | 32.9 |
| 300 | 95 | 18,400 | 1.34 | 35.2 |
| 350 | 103 | 19,500 | 1.52 | 37.5 |
| 400 | 111 | 20,600 | 1.68 | 39.4 |
| 450 | 117 | 21,400 | 1.82 | 41.0 |

During operation, air is sucked in through the motor fan unit 9. The flow of air enters the vacuum cleaner robot 1 through an opening of the floor nozzle 3 and flows through the suction hose 4 into the motor fan unit 9. Due to the fact that—when seen in the direction of air flow—the motor fan unit 9 is arranged upstream of the dust collector (in the form of a vacuum cleaner filter bag), an excess pressure prevails in the housing 8 as well as in the dust collector.

In conventional vacuum cleaners, the motor fan unit is arranged in the dust collection unit downstream of the dust collector, e.g. the vacuum cleaner filter bag, when seen in the direction of air flow, and this has the effect that in particular the housing of the dust collection unit is subjected to a negative pressure. In order to avoid deformation of the housing through said negative pressure, said housing must typically be reinforced, e.g. by means of suitable reinforcing ribs. In the case of the configuration illustrated in FIG. 1, this is not necessary or only necessary to minor extent due to the excess pressure prevailing in the housing 8.

The vacuum cleaner robot 1 comprises a control and navigation unit for automatically moving the dust collection unit 2 and the floor nozzle 3. For this purpose, the housing 8 of the dust collection unit 2 has arranged therein a suitably programmed microcontroller. The control and navigation unit communicates with position determination means. These means comprise cameras 11 and 12 as well as distance sensors 13. The distance sensors may e.g. be laser sensors.

Navigation of the vacuum cleaner robot takes place in the manner known, as described e.g. in WO 02/074150. The control and navigation unit arranged in the housing 8 controls the drive unit of the dust collection unit 2 as well as the drive unit of the floor nozzle 3.

For the last mentioned purpose, a unit is provided for transmitting control signals from the control and navigation unit in the housing 8 of the dust collection unit 2 to the floor nozzle 3, in particular to the drive unit of the floor nozzle. To this end, wireless transceivers may be arranged on the side of the dust collection unit 2 as well as on the side of the floor nozzle 3. Alternatively, also a wired connection for transmitting control signals may be provided along the suction hose.

Also the floor nozzle 3 may comprise one or a plurality of position determination means for supporting the above mentioned ones. For example, path sensors and/or distance sensors may be provided on the floor nozzle. For using the respective information for the purpose of control and navigation, the signals in question are transmitted from the floor nozzle to the control and navigation unit.

The vacuum cleaner robot may be supplied with power in a wired or in a wireless fashion. In particular, the dust collection unit 2 may have a power cable for connection to an electric socket. The floor nozzle, and in particular its driving device, have power supplied thereto via a power supply cable in or along the suction hose 4.

Alternatively or additionally, the dust collection unit 2 may also be provided with rechargeable batteries that can be charged, e.g. by wired or wireless (inductive) charging. For charging the batteries, the vacuum cleaner 1 may move e.g. automatically to a charging station. If the power supply of the driving device of the floor nozzle does not take place exclusively via a power connection through the suction hose 4, also the floor nozzle 3 itself may be provided with rechargeable batteries.

Figure 2:
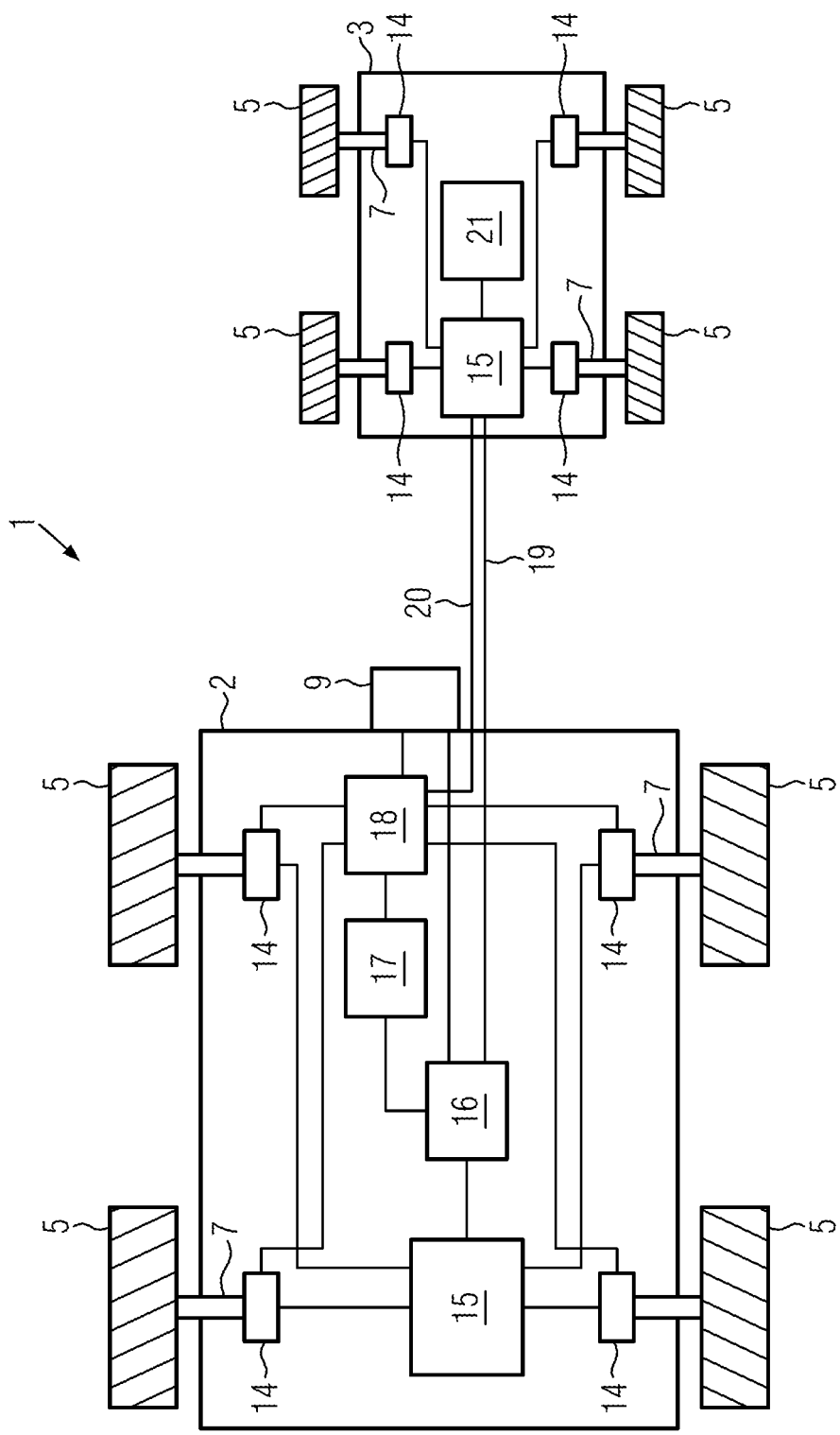
FIG. 2 shows a block diagram of a bipartite vacuum cleaner robot.

FIG. 2 shows a schematic block diagram of a vacuum cleaner robot 1 comprising a dust collection unit 2 and a floor nozzle 3. The driving device for the wheels 5 of the dust collection unit 2 comprises, on the one hand, four drive units 14 in the form of electric motors and, on the other hand, a microcontroller 15 for controlling the electric motors.

Furthermore, the dust collection unit 2 has provided therein a control and navigation unit 16, which serves to automatically move the dust collection unit and the floor nozzle. The control and navigation unit 16 is connected to the microcontroller 15 of the driving device as well as to a further microcontroller 17 constituting a part of the position determination means. In said microcontroller 17, data signals coming from different sensors and/or cameras are processed and made available to the control and navigation unit 16.

In addition, the control and navigation unit 16 is connected to the motor fan unit 9 so as to control the latter.

In the example shown, current and voltage supply takes place via a rechargeable battery 18, which can be charged by wireless or wired charging. For the sake of clarity, not all of the power supply connections are shown in the figure.

Also the floor nozzle 3 is provided with a driving device for its four wheels 5, said driving device comprising, like in the case of the dust collection unit 2, a microcontroller 15 as well as four electric motors 14. The control signals for the driving device of the floor nozzle 3 come from the control and navigation unit 16, which is arranged in the dust collection unit 2. The signals are transmitted via a connection line 19 that may be arranged e.g. in the wall of the suction hose. Alternatively, this signal transmission may, however, also be effected by wireless transmission.

The floor nozzle may be configured as an active floor nozzle (having a driven brush roller) or as a passive floor nozzle (having no driven brush roller).

Current and voltage supply takes place through a rechargeable battery 18 of the dust collection unit 2. To this end, a line 20 is provided, which is arranged in the wall of the suction hose.

Figure 3A:
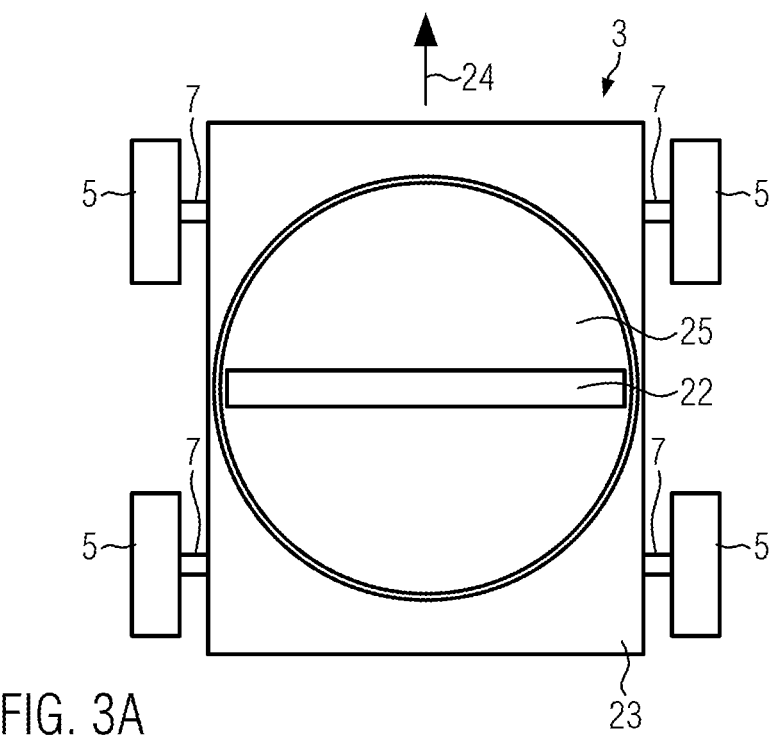
FIGS. 3A and 3B show views from below of a floor nozzle with an air flow channel.

The floor nozzle 3 additionally comprises an electronic rotation control unit 21 for controlling a rotating means provided in the floor nozzle. FIG. 3A is a schematic view of a floor nozzle 3 from below. An air flow channel 22 is provided in the base plate 23 of the floor nozzle 3. The air flow channel 22 shown has, parallel to the base surface of the base plate 23, two parallel longitudinal and two parallel transverse sides, i.e. it is rectangular in shape.

In the embodiment illustrated in FIG. 3A, the wheels 5 of the floor nozzle 3 are driven such that the floor nozzle moves straight on, as indicated by arrow 24. The air flow channel 22 is formed in a rotary disk 25 constituting part of the base plate 23. The rotary disk 25 is supported such that it is rotatable about an axis perpendicular to the base surface of the base plate 23.

The electronic rotation control unit 21 is connected to the microcontroller 15 of the driving device of the floor nozzle 3. Depending on the control of the electric motors 14 of the floor nozzle 3, the electronic rotation control unit 21 orients the air flow channel 22 transversely or perpendicularly to the direction of movement 24 of the floor nozzle 3 by suitably rotating the rotary disk 20.

Figure 3B:
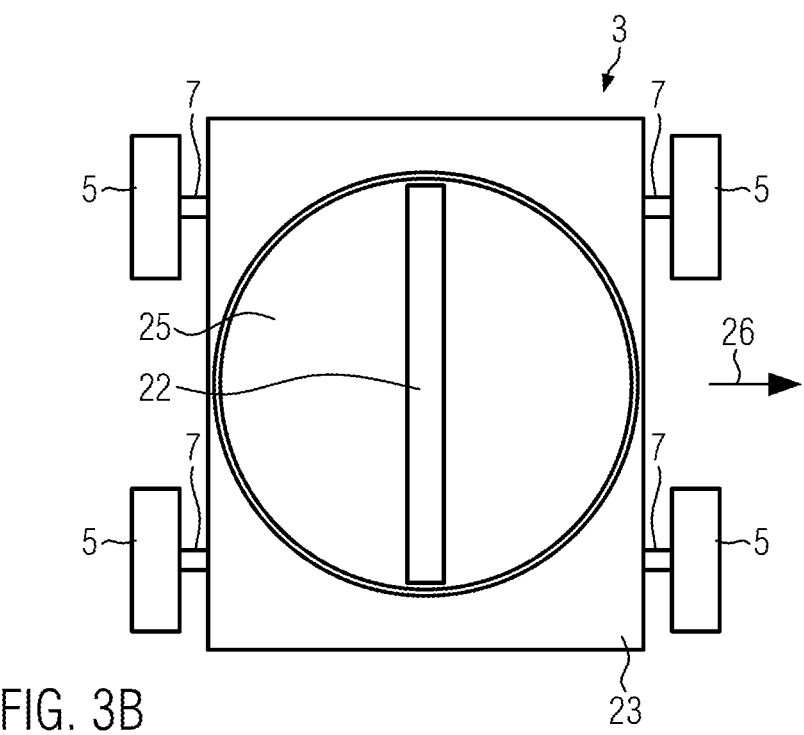

When the wheels 5 of the floor nozzle 3 are driven such that the floor nozzle 3 moves in a transverse direction, as indicated by arrow 26 in FIG. 3B, the electronic rotation control unit 21 will control the rotary disk 20 such that, due to a suitable rotation of the rotary disk 20, the air flow channel 22 will be oriented transversely or perpendicularly to the direction of movement 26 of the floor nozzle 3.

This kind of orientation of the air flow channel 22 is, in principle, possible for arbitrary directions of movement of the floor nozzle 3.

Instead of making use of the electronic rotation control unit 21, the air flow channel may also be oriented mechanically.

Instead of the single air flow channel shown, also a plurality of air flow channels may be provided in the rotary disk. These air flow channels may be arranged e.g. parallel to one another.

Figure 4A:
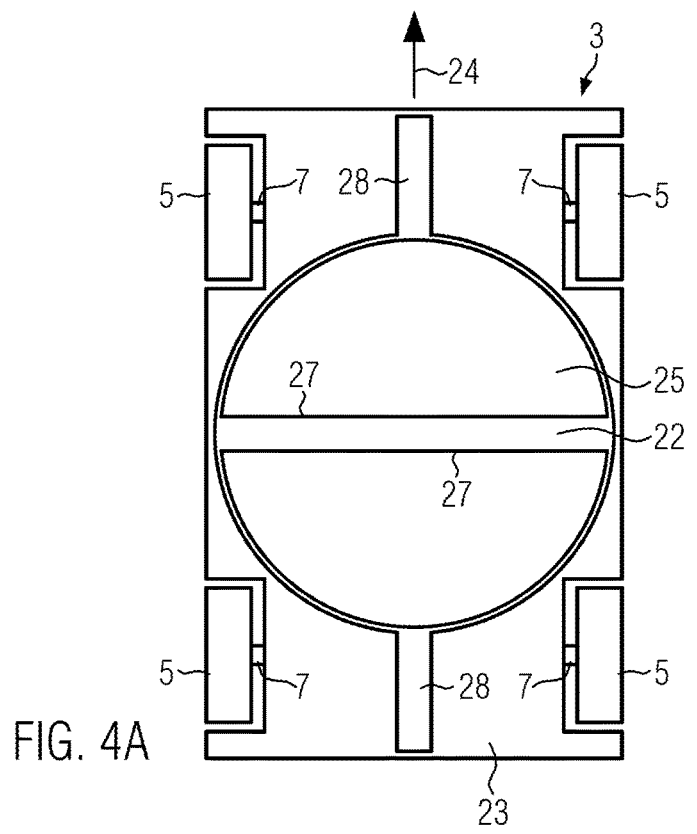
FIGS. 4A and 4B show views from below of a floor nozzle with an air flow channel.

FIG. 4A shows schematically a further view of a floor nozzle 3 from below, elements corresponding to those in FIG. 3A and FIG. 3B being identified by the same reference numerals. In the present example, the wheels 5 are not arranged beside a rectangular base plate, like in FIGS. 3A and 3B, but they are provided within the width (i.e. the maximum width dimensions) of the base plate 23.

The longitudinal side of such a base plate 23 can thus be moved into close proximity to a wall and it can be moved along this wall with a movement in a longitudinal direction, as indicated by arrow 24, without the wheels 5 necessitating a wider distance from the wall.

The air flow channel 22 has two parallel transverse sides 27 and extends across the entire rotary disk. Hence, its transverse length corresponds to the diameter of the rotary disk. The ends of the air flow channel in the transverse direction, i.e. the longitudinal sides, are open.

Figure 4B:
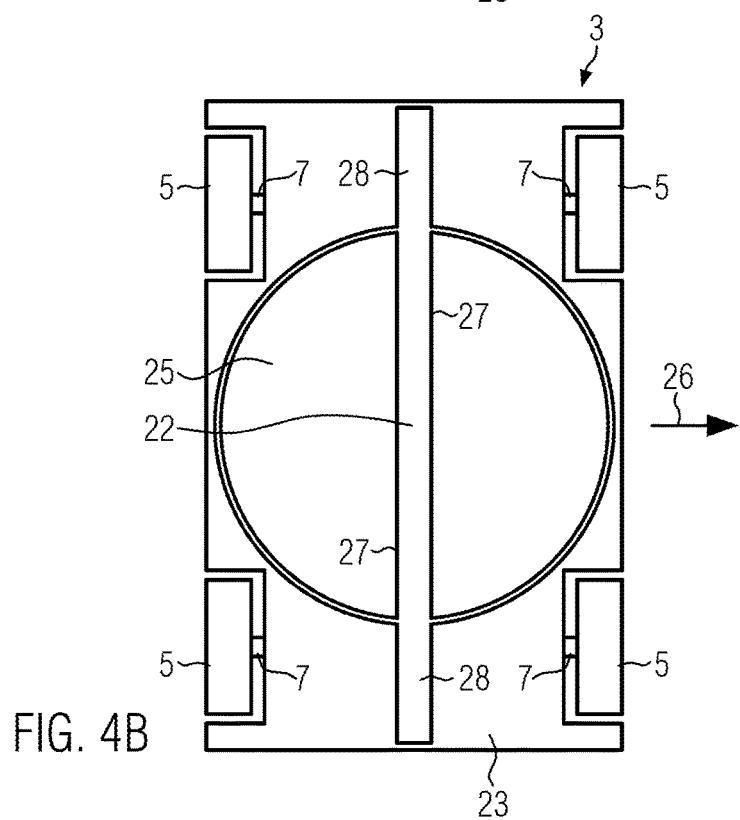

The base plate additionally comprises two subchannels 28, each of said subchannels 28 being open towards the rotary disk at one longitudinal side thereof. If, as shown in FIG. 4B, the floor nozzle moves in a transverse direction, as indicated by arrow 26, the air flow channel will be rotated by 90° and thus be oriented with respect to the new direction of movement. Hence, the subchannels 28 and the air flow channel 22 will be in alignment, so that the latter is extended by the subchannels 28. In this way, the area over which the (extended) air flow channel 22 slides is maximized also in the case of a transverse movement of the floor nozzle.

In the example shown in FIG. 1, the vacuum cleaner is a bag-type vacuum cleaner. This means that the dust collection unit 2 has arranged therein a vacuum cleaner filter bag in which the sucked-in dirt and dust are separated. This vacuum cleaner filter bag may, in particular, be a flat bag whose bag walls comprise one or a plurality of layers of a nonwoven or of a nonwoven fabric. The vacuum cleaner filter bag is configured as a disposable bag.

Especially when single-layer vacuum cleaner filter bags are used, in the case of which the bag wall consists e.g. of precisely one layer of nonwoven fabric in the form of a spunbond, the use of an exhaust filter will be of advantage. By means of the exhaust filter, fine dust, which has not been separated in the vacuum cleaner filter bag, can be filtered out. Such an exhaust filter may have an area of at least 800 $cm^2$. It may especially be configured as a pleated or folded filter, so as to have a large surface area for a smaller base area (smaller than the surface area).

The suction hose 4 has typically a diameter in a range of 25 mm to 50 mm and a length in a range of 500 mm to 2500 mm.

Alternatively to that which has been described hereinbefore, the vacuum cleaner robot may also be a bagless vacuum cleaner, in the case of which the dust collection unit 2 comprises a centrifugal force separator or cyclone, in which the sucked-in dirt and dust particles are separated by means of centrifugal force. Alternatively, the bagless vacuum cleaner may also be configured as an impact separator.

Especially in the case of bagless vacuum cleaners, the dust collection unit is provided with an exhaust filter by means of which fine dust that has not been separated in the centrifugal force separator can be filtered out. This exhaust filter may have an area of at least 800 $cm^2$. It may especially be configured as a pleated or folded filter, so as to have a large surface area for a smaller base area. The exhaust filter may here be provided in a holder of the type described in European patent application No. 14179375.2.

Figure 5:
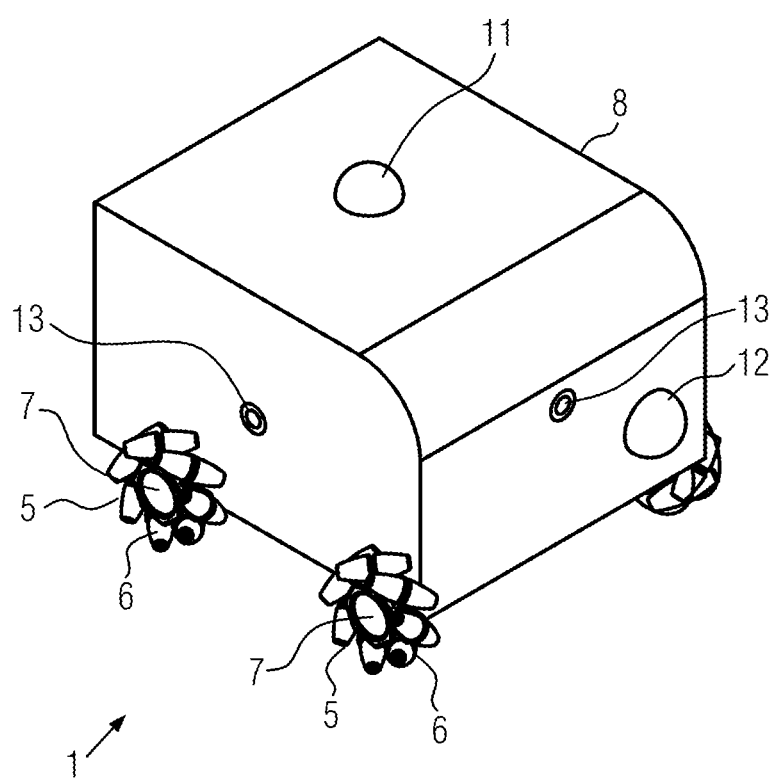
FIG. 5 shows an embodiment of a one-piece vacuum cleaner robot.

FIG. 5 illustrates schematically an alternative embodiment, in the case of which like elements are identified by the same reference numerals as in FIG. 1. In the example shown in FIG. 5, the vacuum cleaner is a one-piece vacuum cleaner robot 1 in the case of which a floor nozzle of the type illustrated in FIG. 3A and FIG. 3B is arranged on the bottom side of the housing 8. Alternatively, the wheels may also be arranged, as illustrated in FIG. 4A and FIG. 4B, within the width of the floor nozzle (and thus within the width of the entire one-piece vacuum cleaner robot).

In the interior of the housing 8, a motor fan unit as well as a dust collection unit are arranged. The floor nozzle and the dust collection unit are thus jointly supported on the wheels 5 according to this example.

In the case of this example, the vacuum cleaner robot 1 may have an actively driven brush roller. A motor fan unit (no matter whether in the form of a clean air or a dirty air motor) may, but need not, be provided.

As for the rest, the features described in connection with the other figures are also used in the example according to FIG. 5 in an analogous manner.

The invention claimed is:

1. A vacuum cleaner robot comprising a floor nozzle supported on wheels and a dust collection unit,
    wherein the floor nozzle comprises a driving device for driving at least one of the wheels of the floor nozzle,
    wherein one of the wheels, a plurality of or all of the wheels of the floor nozzle are omnidirectional wheels,
    wherein the floor nozzle comprises a base plate with a base surface, which, when the vacuum cleaner robot is in operation, faces the surface to be cleaned, the floor nozzle comprising a rotary disk positioned entirely within an outer circumference of the base plate, the rotary disk having provided therein an air flow channel comprising an aperture, which extends parallel to the base surface and through which air to be cleaned enters the floor nozzle, and
    wherein the floor nozzle comprises a rotating member for rotating the air flow channel about an axis perpendicular to the base surface, the rotary disk being part of the rotating member, the rotary disk being rotatable relative to the base plate about an axis perpendicular to the base surface of the base plate.

2. The vacuum cleaner robot according to claim 1, wherein the rotating member is configured for orienting the air flow channel perpendicular to a direction of movement of the floor nozzle.

3. The vacuum cleaner robot according to claim 1, wherein the rotary disk is supported such that it is rotatable about the axis perpendicular to the base surface of the base plate and which has the air flow channel formed therein.

4. The vacuum cleaner robot according to claim 1, comprising a rotation control unit for controlling the rotating member, wherein the rotation control unit is coupled to the driving device of the floor nozzle.

5. The vacuum cleaner robot according to claim 1, wherein the air flow channel has, in a transverse direction, a dimension of at least 90% of a width of the floor nozzle.

6. The vacuum cleaner robot according to claim 1, wherein the dust collection unit is supported on wheels separately from the floor nozzle and is in fluidic communication with the floor nozzle via a suction hose, wherein the dust collection unit comprises a driving device for driving at least one of the wheels of the dust collection unit.

7. The vacuum cleaner robot according to claim 6, wherein the dust collection unit is supported on wheels separately from the floor nozzle, and wherein one of the wheels, a plurality of or all of the wheels of the dust collection unit are omnidirectional wheels.

8. The vacuum cleaner robot according to claim 1, further comprising a motor fan unit for sucking in a flow of air through the floor nozzle.

9. The vacuum cleaner robot according to claim 8, wherein the motor fan unit is arranged between the floor nozzle and the dust collection unit such that a flow of air sucked in through the floor nozzle will pass through the motor fan unit and flow into the dust collection unit.

10. The vacuum cleaner robot according to claim 8, wherein the motor fan unit comprising in particular a radial fan.

11. The vacuum cleaner robot according to claim 1, wherein the dust collection unit is in fluidic communication with the floor nozzle via a suction hose, and wherein the motor fan unit is arranged between the suction hose and the dust collection unit such that the flow of air sucked in through the floor nozzle will pass through the suction hose and flow into the motor fan unit, and pass through the motor fan unit and flow into the dust collection unit.

12. The vacuum cleaner robot according to claim 11, wherein the dust collection unit comprises a housing and a dust collector arranged within said housing, the motor fan unit being arranged on, at or in said housing.

13. The vacuum cleaner robot according to claim 11, comprising an exhaust filter.

14. The vacuum cleaner robot according to claim 11, wherein the vacuum cleaner robot is a bag-type vacuum cleaner.

15. The vacuum cleaner robot according to claim 11, comprising a control and navigation unit for an automatic movement of the floor nozzle or of the dust collection unit or comprising one or a plurality of position determination members.

16. The vacuum cleaner robot according to claim 11, wherein the air flow channel has, in a transverse direction, a dimension of at least 90% of a width of the base plate or of the rotary disk.

\* \* \* \* \*